(12) United States Patent
Schmidt

(10) Patent No.: US 6,578,314 B1
(45) Date of Patent: Jun. 17, 2003

(54) MOLE TRAP CHOKE

(76) Inventor: Thomas Frederick Schmidt, 2533 Orland Ave., Cincinnati, OH (US) 45211

(*) Notice: Subject to any disclaimer, the term of this patent is extended or adjusted under 35 U.S.C. 154(b) by 0 days.

(21) Appl. No.: 09/994,558

(22) Filed: Nov. 27, 2001

(51) Int. Cl.[7] .............................................. A01M 23/24
(52) U.S. Cl. .................................. 43/94; 43/85; 43/88
(58) Field of Search ............................... 43/88–97, 81, 43/85, 63

(56) References Cited

U.S. PATENT DOCUMENTS

| 280,811 A | 7/1883 | Gilleland et al. | |
|---|---|---|---|
| 1,184,667 A | 5/1916 | Appleby | |
| 1,256,339 A | * 2/1918 | Lindquist | 43/88 |
| 1,296,407 A | 3/1919 | Layton | |
| 1,385,024 A | 7/1921 | Russell | |
| 1,485,746 A | * 3/1924 | Ward | 43/88 |
| 1,549,565 A | * 8/1925 | Stadler | 43/88 |
| 1,557,043 A | 10/1925 | Graham | |
| 1,924,241 A | 8/1933 | Hassler | |
| 2,432,723 A | 12/1947 | Carpenter | |
| 2,446,078 A | * 7/1948 | Churchill | 119/807 |
| 4,765,087 A | * 8/1988 | Holtgrefe, Sr. | 43/94 |
| 4,856,225 A | * 8/1989 | Radesky et al. | 43/67 |
| 5,010,682 A | * 4/1991 | Saccon | 43/77 |
| 5,307,587 A | 5/1994 | Zeiger et al. | 43/88 |
| 6,101,761 A | 8/2000 | Sprick | 43/88 |

FOREIGN PATENT DOCUMENTS

FR 2726736 A1 * 5/1996 .......... A01M/23/24

* cited by examiner

Primary Examiner—Charles T. Jordan
Assistant Examiner—Susan Piascik
(74) Attorney, Agent, or Firm—Wood, Herron & Evans, L.L.P.

(57) ABSTRACT

A combination mole trap and choke for use with the mole trap. The choke effectively functions to reduce the size of the opening through which the mole passes. The choke ensures that upon passage of a mole through a tunnel, the trap will activate thereby causing the jaws to come together on the mole. The choke may be removably or permanently secured to the free end of a trip-pan which integrally forms a part of the mole trap.

9 Claims, 2 Drawing Sheets

MOLE TRAP CHOKE

FIELD OF THE INVENTION

This invention relates to traps for killing burrowing animals such as rodents, gophers and moles.

BACKGROUND OF THE INVENTION

Moles are commonly thought of in the United States as pests because of their habit of uprooting the soil or turf, pushing up earth mounds and disturbing the roots of plants, displacing bulbs and creating general havoc in crops, lawns and landscaped areas such as, for example, those on golf courses. In addition, in certain locations moles cause erosion problems. In certain agricultural areas moles interfere with mowing equipment or other machinery used for planting and harvest. In order to control moles, various methods such as applying insecticides to the soil have been used in addition to poison baits and burrow fumigants.

However, the most common method of killing moles is a trap. Numerous types of traps have been developed and are the subject of patents. One of the most common type of traps is a scissors-type trap such as is disclosed in U.S. Pat. No. 615,851, which is fully incorporated by reference herein. These scissors-type traps are activated by either a leaf or coil spring and have two pairs of opposing gripping arms which move in unison to kill a mole passing between the gripping arms. Such traps function to kill moles traveling in either direction through the mole's tunnel or passageway. When set, the gripping arms straddle the mole tunnel from above. When activated, the trap kills the animal with a forceful blow.

U.S. Pat. No. 5,307,587 discloses another type of scissors-type mole trap. This trap is actuated by the animal pressing up against a trigger, thereby closing the vertically oriented jaws. This type of trap, like other types of scissor traps, is suited for capturing moles as the moles travel along a mole run or tunnel and enter between the vertically oriented jaws thereby raising a trigger mechanism so as to set off the trap and close the jaws.

One difficulty with this type of trap is that often the mole does not move enough dirt to exert an adequate upwardly directed force upon the trigger of the trap. When soil conditions are extremely wet or extremely dry, this difficulty is amplified. Thereby, the mole is able to pass through the trap undetected and avoid setting off the trap.

Often mole trap manufacturers advise consumers to build a loose pile of dirt or bump in the mole tunnel in the area where the mole trap is to be set to help ensure that the trigger of the trap is activated when a mole passes beneath the trap. Building such a bump is time consuming and the resulting structure regularly fails to achieve its purpose.

Therefore, it has been one objective of the present invention to provide a scissors-type mole trap having a choke attached to a trip pan of the trap so a mole passing beneath the trap more easily actuates the trap.

It has further been an objective of the present invention to provide an accessory device which may be removably secured to scissors-type mole traps quickly and easily.

It has further been an objective of the present invention to provide an inexpensive accessory device which may be used in connection with scissors-type mole traps.

SUMMARY OF THE INVENTION

The invention of this application which accomplishes these objectives comprises a scissors-type mole trap having a choke secured to a trip pan of the trap. The choke may be permanently secured to the trip pan or removably secured thereto. The function of the choke is to reduce the size of the mole's tunnel thereby making it more difficult for the mole to pass therethrough without activating or setting off the trap.

Although the removable choke of the present invention may be used with numerous types of mole traps, one type of trap which has proven particularly amenable to the choke of the present invention is a scissors-type mole trap like that described in U.S. Pat. No. 615,851. This type of mole trap comprises a pair of generally U-shaped members hingedly joined together by a horizontally oriented pin defining a horizontal pivot axis. Each of the U-shaped members have a pair of spaced-apart legs joined by a generally arcuate top portion. The legs are joined by a crossbar. Each leg terminates in a jaw at the lower end of the leg. The U-shaped members are urged or biased together by a spring which encircles the horizontally oriented pin and has a pair of end portions or arms which engage the crossbars of the U-shaped members urging them toward one another.

In order to open the trap, the top portions of the generally U-shaped members are pulled together against the force of the spring thereby opening the jaws of the trap. A trip-pan is secured to one the crossbars of one of the U-shaped members. The trip-pan has a flange on one end and a free end at the opposite end. In order to set the trap in an open position, a trigger extending downwardly from one of the U-shaped members engages the flange of the trip-pan thereby holding the jaws open against the force of the spring.

The choke of the present invention is secured to the free end of the trip-pan and is located inside the mole's tunnel. Upon a mole trying to pass through its tunnel blocked by the choke, the mole choke pushes upwardly along with the free end of the trip-pan. Consequently the flanged end of the trip-pan moves downwardly causing the trigger to disengage from the trip-pan. The spring then urges the jaws of the U-shaped members together trapping the mole between the jaws and preferably killing the mole.

The choke of the present invention is preferably made of wood but may be made of other materials such as plastic or metal. The choke may have a recess or receptacle adapted to receive the free end of the trip-pan so that the choke may be easily slid on to or off of the free end of the trip-pan by a user.

By effectively reducing the diameter or size of the mole tunnel or passageway with the choke, the mole is forced to exert upward pressure on the trip-pan thereby activating the trap and releasing the trigger. Thus, the success rate of a scissors-type mole trap such as that disclosed in U.S. Pat. No. 615,851 is enhanced by the choke of the present invention.

These and other objects and advantages of the present invention will be more readily apparent from the following description of the drawings.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE DRAWINGS

Figure 3:
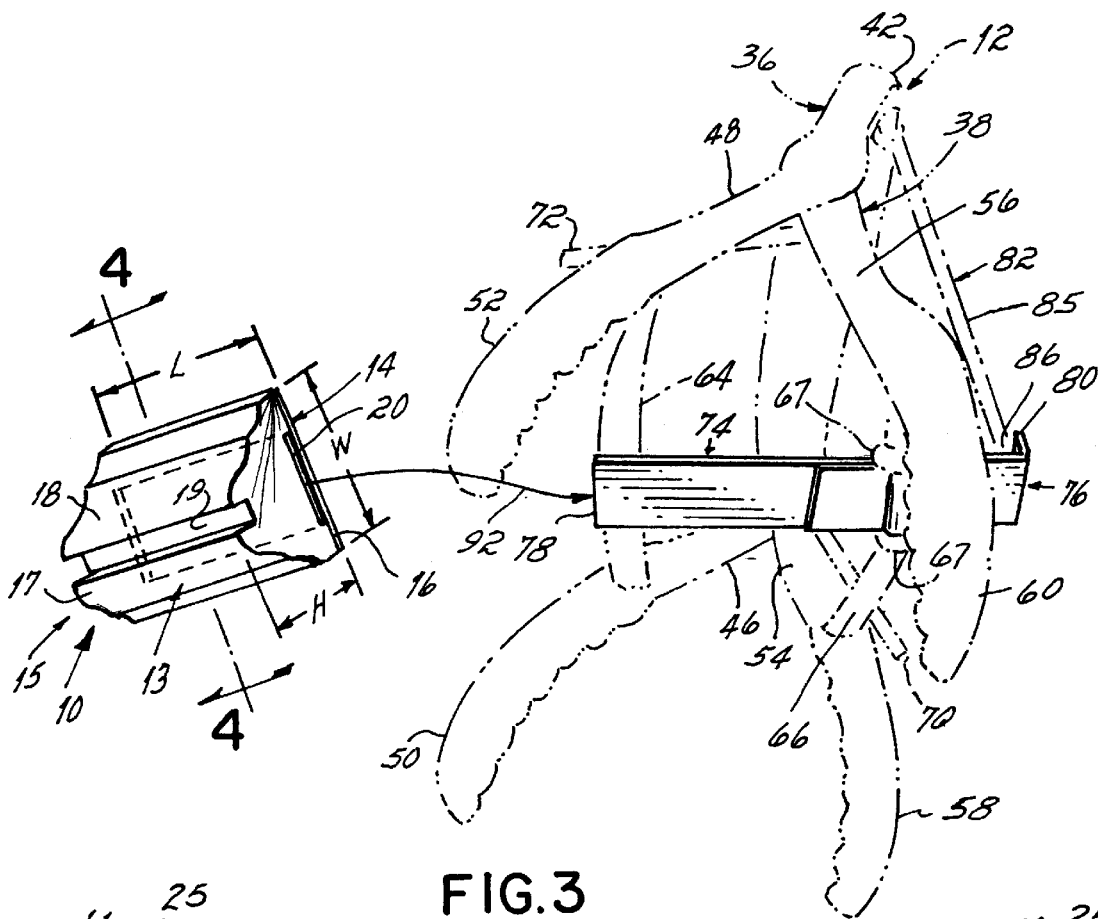
FIG. 3 is a bottom perspective view of the choke of the present invention being inserted onto the trip-pan of a mole trap in accordance with the present invention.
Figure 4:
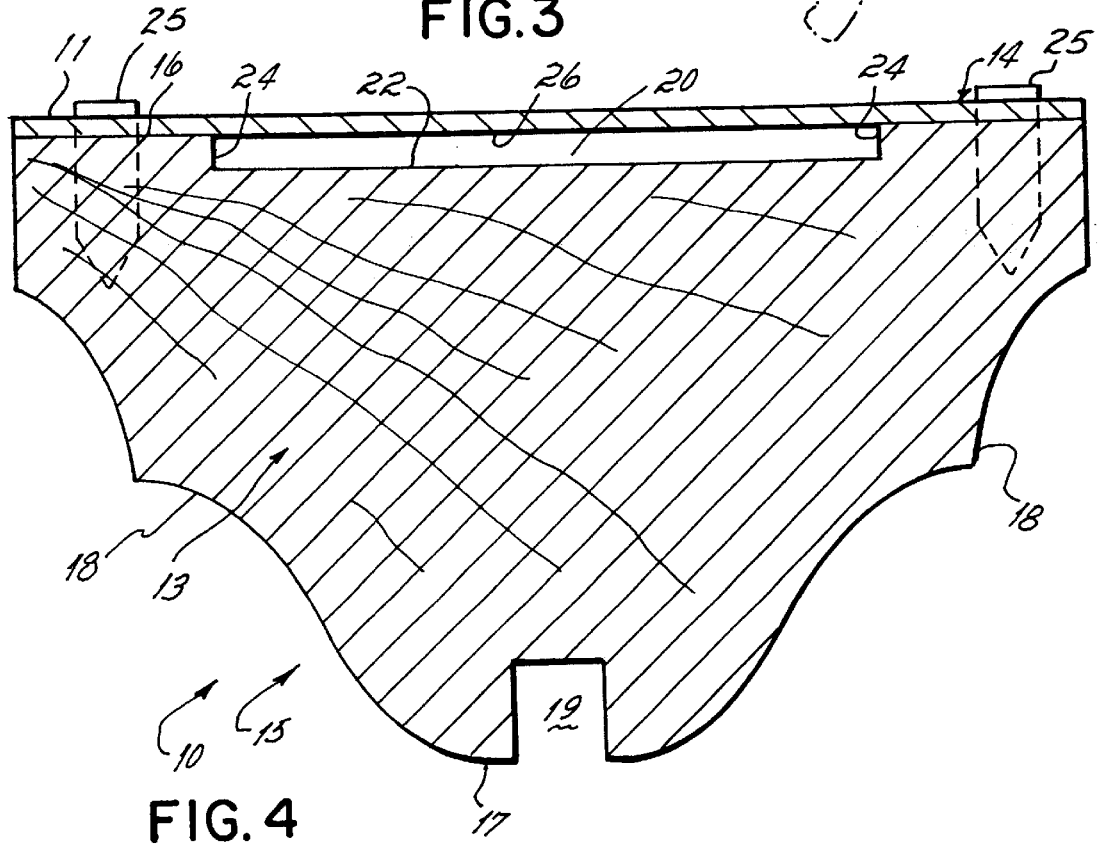
FIG. 4 is a cross-sectional view taken along the line 4—4 of FIG. 3.

Referring to the drawings and particularly to FIGS. 3 and 4, there is illustrated a choke 10 adapted to be removably secured to a mole trap 12 in order to enhance the mole trap's ability to capture moles.

As illustrated in FIG. 4, the choke 10 comprises a base 13 and a top 14 which together form a choke body 15. The top 14 is secured to the base 13 with staples 25 or any other type of fastener. Alternatively, the top 14 may be secured to the base 13 with adhesive or any like material. The choke 10 has a longitudinally extending length L, a width W and a height H. The choke 10 has an upper surface 11, a lower surface 17 and a pair of opposed side surfaces 18. A groove 19 extends longitudinally along the length L of the choke and extends upwardly from the lower surface 17. The groove 19 functions to effectively trap or catch dirt as the mole pushes forwardly, causing the dirt to push upwardly and forwardly into the groove 19. The groove 19 enhances the ability of the choke 10 to activate the trap 12.

The upper surface 16 of the base 13 of the choke 10 has a cut out portion, recess or receptacle 20 extending downwardly from the upper surface of the base 13. The receptacle 20 is located between the top 14 and upper surface of the base 13. More particularly, the receptacle 20 has a floor 22 and a pair of side walls 24 and a ceiling 26 which is a part of the top 14 of the choke. This receptacle 20 is adapted to receive a portion of the mole trap 12 in a manner which will be described below.

The base 13 of the choke 10 is preferably made of wood but may be made of other materials such as steel, plastic or others. The top 14 of the choke is preferably made of metal such as aluminum but may be made of other materials such as plastic, wood or others.

Figure 1:
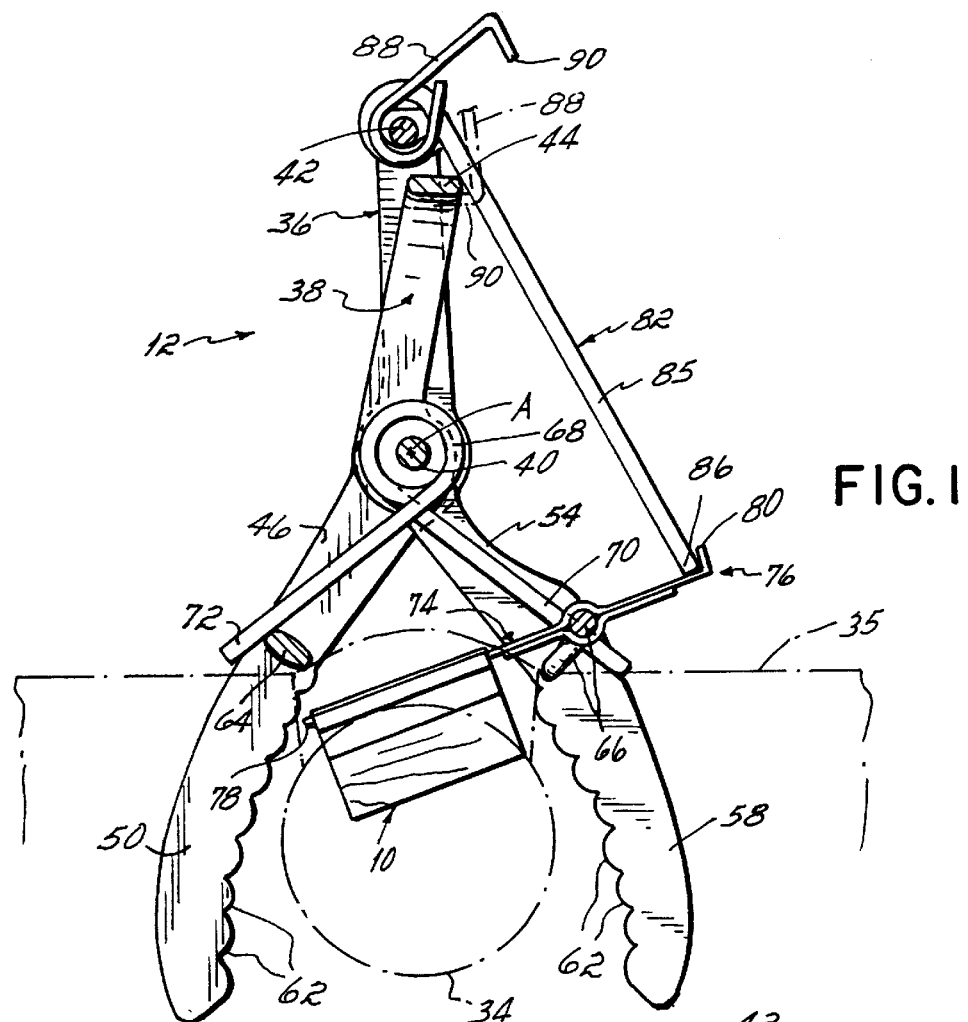
FIG. 1 is a cross-sectional view of a mole trap having the choke of the present invention secured thereto, the mole trap being set in an open position.
Figure 2:
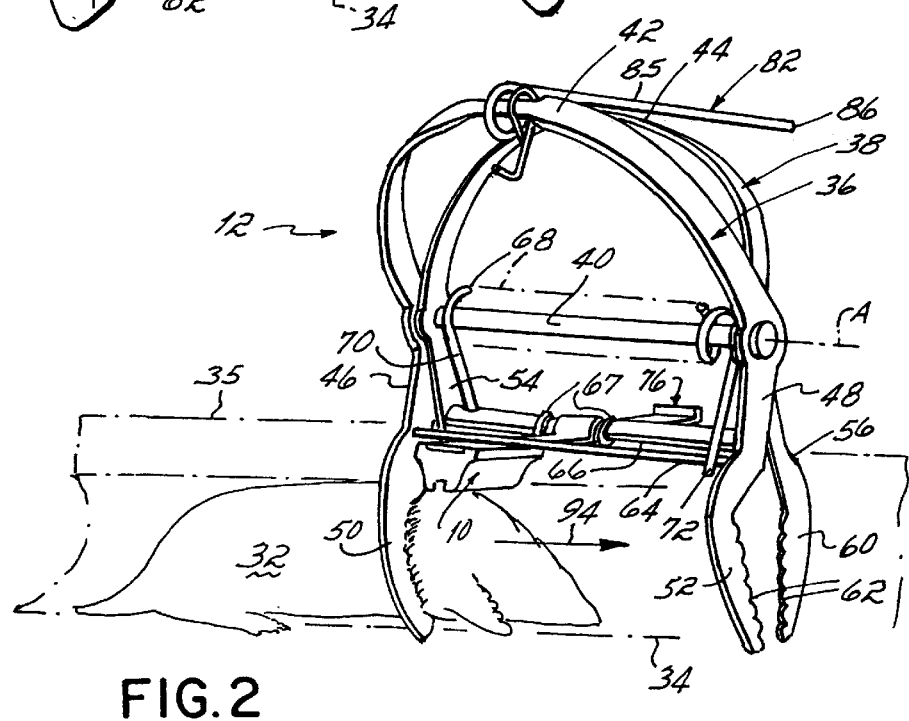
FIG. 2 is a perspective view of the mole trap of FIG. 1 in a closed position, the jaws having captured a mole.

The choke 10 of the present invention may be used with many different types of mole traps. However, one type of mole trap, commonly referred to as a scissors-type of mole trap, is illustrated and described in this application. This scissors-type mole trap is the subject of U.S. Pat. No. 615,851 which is fully incorporated by reference herein. Referring to FIGS. 1 and 2, the mole trap 12 is designed to capture and kill a mole 32 as illustrated in FIG. 2. As is commonly known in the art, moles 32 travel beneath the earth's surface 35, along underground tunnels or passage ways 34. Referring to FIGS. 1 and 2, the mole trap 12 comprises generally U-shaped members 36, 38 hingedly joined together by a horizontally oriented pin 40 which defines a pivot axis A. The pin 40 passes through holes in the generally U-shaped members 36, 38. Each generally U-shaped member 36, 38 has a generally U-shaped upper portion 42, 44 respectively extending downwardly into two legs. Generally U-shaped member 36 has two spaced legs 46, 48 which terminate in jaws 50, 52. Likewise, generally U-shaped member 38 extends downwardly into legs 54, 56 terminating in jaws 58, 60, respectively. Each of the jaws 50, 52, 58, 60 have serrations 62 thereon formed along an inner surface thereof to provide better penetration of the mole upon closure of the jaws.

As best illustrated in FIG. 1, a crossbar 64 is an integral part of the generally U-shaped member 36 and extends between legs 46 and 48. Similarly, a crossbar 66 forms an integral part of generally U-shaped member 38 and extends between legs 54 and 56. A spring or biaser 68 is wrapped around the pin 40 and functions to urge opposite jaws 50, 58 and 52, 60 together. The spring 68 has a first end portion or arm 70 which engages the crossbar 66 of the generally U-shaped member 38 and, at its opposite end, a second arm or end portion 72 which pushes inwardly on the crossbar 64 of the generally U-shaped member 36. Thus by pushing inwardly on the crossbars 64, 66, the arms 70, 72 of the spring 68 urges the mole trap 12 towards its closed position illustrated in FIG. 2 from its open position illustrated in FIG. 1. At rest, the mole trap 12 is in its closed position illustrated in FIG. 2.

As best illustrated in FIG. 3, a trip-pan 74 is secured to the crossbar 66 of the U-shaped member .38. A pair of flanges 67 integrally formed in the crossbar 66 prevent the trip-pan 74 from moving laterally. The trip-pan 74 has a first flanged end 76 and a second free end 78. The flanged end 76 has an upwardly directed flange 80 adapted to engage a trigger 82. As best illustrated in FIGS. 1 and 3, the trigger 82 comprises a piece of wire wrapped around the upper portion 42 of U-shaped member 36 and a linear portion 85 which terminates in a terminal end 86. In order to move the mole trap 12 from its closed position to its open position, the upper portions 42 and 44 of U-shaped members 36, 38 are pressed together against the bias of the spring 68 thereby opening the jaws 50, 58 and 52, 60. The trigger 82 is then moved to its position illustrated in FIG. 1 in which its terminal end 86 engages the flange 80 of the trip-pan 74. The pressure of the trigger 82 against the flange 80 of the trip-pan 74 keeps the trap in its open position.

A locking wire 88 having a hook 90 is wrapped around the upper portion 42 of the U-shaped member 36. In order to lock the trap in its open position, the hook 90 may be placed over the upper portion 44 of the U-shaped member 38 in a position illustrated in dash lines in FIG. 1.

Once the mole trap 12 is placed in its open position illustrated in FIG. 3, the choke 10 is moved in the direction of arrow 92 toward the free end 78 of the trip-pan 74 until the trip-pan 74 passes through the receptacle 20 of the choke 10. As illustrated in FIGS. 1 and 2, the choke 10 remains secured to the trip-pan during the operation of the mole trap.

In operation, as a mole passes in either direction through the tunnel 34 (see arrow 94 of FIG. 2) the mole 32 causes dirt to push upwardly against the choke 10 thereby raising the free end 78 of the trip-pan 74 and causing the flanged end 76 of the trip-pan 74 to lower. Thus, the spring 68 urges the crossbars 64, 66 towards one another thereby closing the jaws of the trap together, the terminal end 86 of the trigger 82 disengaging from the flanged end 76 of the trip-pan 74 as illustrated in FIG. 2. Thus, the jaws 50, 58 come together along with the jaws 52, 60 thereby trapping the mole or killing the mole.

Before the present invention, a mole may have passed through the tunnel without activating the trap because the mole passed underneath the free end of the trip-pan without exerting adequate force so as to raise the free end of the trip-pan and consequently lower the flanged end of the trip-pan. However, with the present invention the choke reduces the size or diameter of the tunnel thereby making it more likely for the mole to raise the free end of the trip-pan and thus activate the trap.

While I have described one preferred embodiment of the present invention, those skilled in the art will appreciate changes and modifications which may be made to the present invention without departing from the scope of the present invention. For example, other configurations of chokes may be used in accordance with other types of mole traps having different types of triggering methods. Therefore, I intend to be limited only by the scope of the following claims.

What is claimed is:

1. A removable choke for use with a mole trap, said choke comprising:

a base; and a top separable from said base, said top being secured to said base such that a receptacle is defined between said top and said base, said removable choke being adapted to be removably secured to a trip-pan of a mole trap.

2. The removable choke of claim 1 wherein said base is made of wood.

3. The removable choke of claim 1 wherein said top is made of metal.

4. The removable choke of claim 1 wherein said base has a longitudinally extending groove along a lower surface thereof.

5. A choke for use with a mole trap, said choke having a longitudinally extending length defined between a pair of end surfaces, a width defined between a pair of side surfaces and a height defined between an upper surface and a lower surface, said choke comprising:

a body; and a rectangular receptacle having a floor, a pair of side walls and a ceiling and extending longitudinally through said body, said receptacle being adapted to receive a portion of a trip-pan of a mole trap to secure said choke to said mole trap.

6. The choke of claim 5 wherein said body is made of wood.

7. A removable choke for use with a mole trap having a trip-pan, said choke comprising:

a wooden base; and a top secured to said base; and a generally rectangular receptacle extending through a top central portion of said base, said receptacle being adapted to received said trip-pan of said mole trap.

8. The choke of claim 7 wherein said top is secured to said base with fasteners.

9. A removable choke for use with a mole trap having a generally planar trip-pan, said choke comprising:

a wooden base; and a top secured to said base; and a generally rectangular receptacle extending through said base, said receptacle being adapted to received said generally planar trip-pan of said mole trap.

* * * * *